UNITED STATES PATENT OFFICE.

GEORGE W. MILES, OF SANDWICH, MASSACHUSETTS, ASSIGNOR TO ROSS CHEMICAL COMPANY, A CORPORATION OF MAINE.

WATER-RESISTANT COATING MATERIAL AND METHOD OF MAKING IT.

1,354,575. Specification of Letters Patent. Patented Oct. 5, 1920.

No Drawing. Application filed January 10, 1919. Serial No. 270,605.

*To all whom it may concern:*

Be it known that I, GEORGE W. MILES, a citizen of the United States of America, and resident of Sandwich, in the county of Barnstable and State of Massachusetts, have invented new and useful Improvements in Water - Resistant Coating Materials and Method of Making Them, of which the following is a specification.

My invention relates to coating materials for coating or printing, among other things, paper or textiles, and the object of my invention is to provide a coating material which shall be water-resistant, so that the material coated therewith shall be water-resistant or water-proof, or so that coloring matter applied with the coating material will not be sensitive to moisture and therefore will not run or smear. Further, my object is to provide a coating material having the indicated properties which will flow freely when—as will practically always be the case—it is diluted with water, and which will be effective for the purposes indicated at ordinary temperatures, so that the usual practice of coating mills will not have to be qualified or complicated by heating apparatus for the purpose of preparing or applying the coating material.

My new coating material has for its basis a resin-ammonia soap, which in itself and in its mode of preparation is new, and which, unlike resin-ammonia soaps heretofore known and produced, has the property of indefinite extension or dilution in water, at ordinary temperatures, without impairment of its free-flowing character. If, for instance, an ammonia-resin soap be made by grinding ordinary rosin and saponifying it in an equal weight of water with ammonia in quantity sufficient for complete saponification, the soap is of the consistency of ordinary potash-tallow soft soap, possibly a little thicker. Attempt at dilution or extension of this soap in cold water fails to produce anything but a slimy, irregularly fluid, stringy mass, of no use as a coating material. If it be heated, the dilute solution becomes clear and of uniform fluidity. As more or less extensive water-dilution is practically inevitable in the ordinary practice of coating such material as paper, textiles, etc., this peculiarity of known resin-ammonia soaps constitutes a serious obstacle to their use.

I have discovered that if a resin be oxidized before saponification, the ammonium resinate formed therewith is free from the objections and disadvantages above noted. A simple way to oxidize a resin is to grind it to a powder and expose it thoroughly to the air for a considerable time. It will eventually oxidize, but this method while feasible is slow, and uncertain.

In order to enable air-oxidation of resin to proceed more expeditiously and uniformly than it will when comminuted resin is merely exposed to the air for a long time, it is preferable to prepare the resin by wetting or saturating it with some substance which, when the resin is afterward dried in and exposed to the air, will stimulate the air-oxidation. I have discovered several such promoters of oxidation of resin, and found that the results of employing them are in various degrees more satisfactory and reliable than oxidation by mere exposure of resin in comminuted condition. In all cases I recommend that the resin be quite finely ground. Oxidation in contact with air will be promoted if the ground resin be saturated with a solution of bleaching powder (calcium hypochlorite) or with a dilute solution of formaldehyde or with dilute sulfuric acid, or with a solution of sulfur dioxid in water, or with milk of lime with a small percentage of soda-ash in solution, or by adding turpentine to an already water-wet resin. In all the above cases, after wetting the resin with the promoter of subsequent oxidation, dry the resin and expose it thoroughly to air. The various substances enumerated as preparatory agents do not of themselves effect oxidation of resin; they appear to act as catalysts, to accelerate the union of the oxygen in the air with the resin, or such part of it as is actually exposed. In all such cases, the oxidation is air-oxidation; the promoters shorten the necessary period of exposure of the comminuted resin to a few days; whereas for thorough oxidation without any promoting-agent, exposure of resin to air for a very long period—probably months—is necessary, and even then the oxidation is liable to be far from uniform.

It will be found advantageous to maintain the rosin at a temperature of about 110° F., during drying and subsequent exposure to air. The oxidation will be complete when a sample of the rosin, saponified in an equal weight of water containing the amount of ammonia required for saponification, yields a clear solution which is indefinitely extensible in water. The resin may be oxidized by the direct action of a strong solution of hydrogen peroxid, and then dried.

But the method which I believe to be the best, and which I prefer to employ, is as follows:

Melt rosin, and add thereto a mixture of 5% turpentine, 1% soda ash and ½% of slaked lime; these percentages being referred to the weight of the rosin. Cool and grind the mixture to pass a 60 mesh sieve, and expose the ground mass to a temperature of about 110° F. until a sample yields a clear and indefinitely extensible fluid solution in an equal weight of water containing the requisite amount of ammonia for saponification.

For purposes of economy, a small proportion of caustic soda may be used with the ammonia; the quantity should be such as not to produce enough soda soap to impair sensibly the waterproof quality of the resinate solution.

Various softening substances may, if desired, be introduced into the solution of ammonium resinate, for instance, an oil, gelatin, wax emulsion; if the physical properties of the finally dried coating, imparted thereto by such substances, are regarded as useful.

Rosin soap solutions compounded as above prescribed may be mixed with colors and will then be ready for use as colored coating solutions.

For purposes of shipment and supply to coating mills such a rosin-ammonia soap (either with or without admixture of rosin-soda or other cheaper rosin soap) should be made up as a relatively concentrated water-solution, containing from 50% to 70% solids. In use for coating purposes, this soap solution will be reduced with water, either clear, or as a vehicle for colors, to the proper consistency for the work in hand.

When paper, textiles, etc., are coated or printed with a solution of rosin-ammonia soap, prepared as above described, the deposition of the rosin-ammonia soap, spread thinly on the coated or printed material, leaves a finely divided, evenly distributed coating of rosin, which imparts to the coating in its final condition a water or moisture resistant property, in degree proportionate (roughly speaking) to the quantity of rosin-ammonia soap in the coating solution. No matter how far this solution may have been extended by the addition of water, its free flowing property will remain unimpaired, and its effectiveness as a coating material conserved. Dilution with cold water, with preservation of the free flowing property, characterizes the above described rosin-ammonia soap solution, and distinguishes it from ammonium resinate prepared by ammonia-saponification of ordinary, i. e., unoxidized, resin.

The herein described method of oxidizing resin, and the product thereof forms the subject matter of an application for Letters Patent of the United States, filed as a division hereof, Serial No. 349,997.

I claim:

1. An ammonium resinate of an oxidized resin.

2. The method of preparing a coating material, which comprises in saponifying an oxidized resin with ammonia.

3. The method of preparing a coating material, which consists in saponifying an oxidized resin with ammonia and another alkali.

4. An ammonium resinate of an oxidized resin, with a softening component therein.

5. The method of preparing a coating material, which comprises saponifying an oxidized resin with ammonia, and subsequently reducing the concentration of the solution with water at ordinary temperature.

6. The method of preparing a coating material, which comprises saponifying an oxidized resin with aqueous ammonia, the water employed being not materially in excess of the resin, by weight.

7. The method of preparing a material adapted to form coatings, which consists in saponifying an oxidized resin.

Signed by me at Boston, Massachusetts, this eighth day of January, 1919.

GEORGE W. MILES.